July 18, 1944.  E. MARTIN ET AL  2,353,681
PROPELLER HUB DAMPER
Filed Nov. 3, 1939
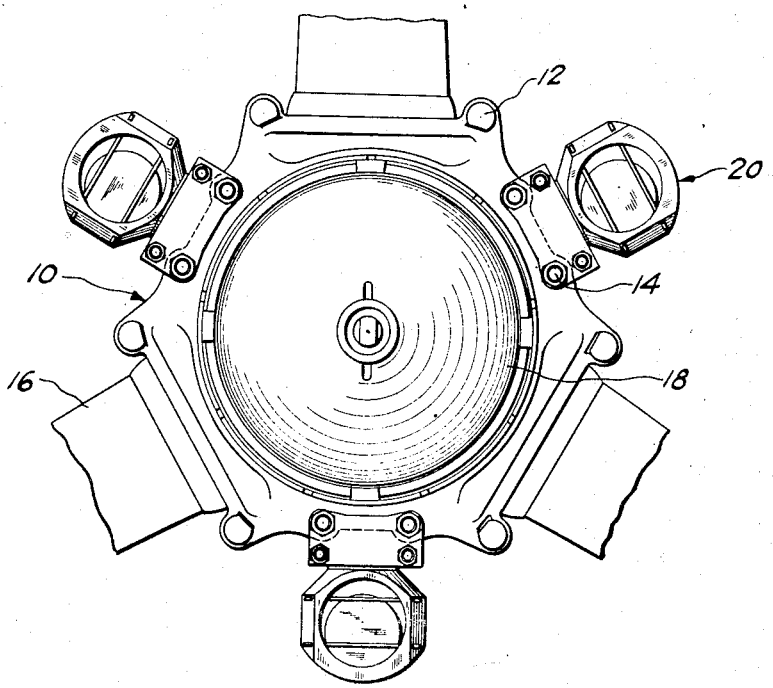
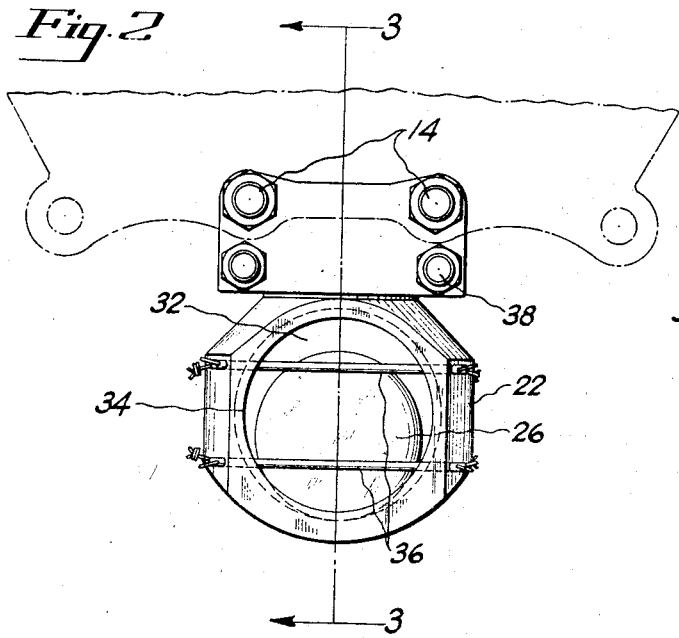
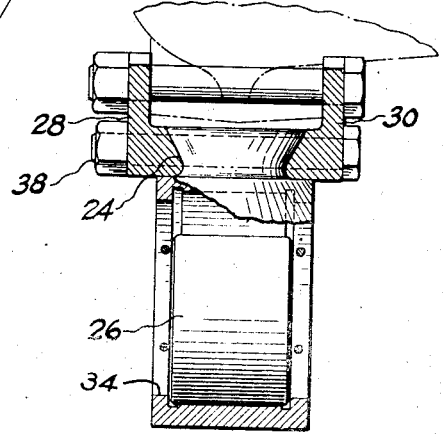
INVENTORS
Erle Martin
Charles M. Kearns Jr.
Harris G. Luther
ATTORNEY Patented July 18, 1944

2,353,681

UNITED STATES PATENT OFFICE 2,353,681

PROPELLER HUB DAMPER

Erle Martin and Charles M. Kearns, Jr., West Hartford, Conn., assignors to United Aircraft Corporation, East Hartford, Conn., a corporation of Delaware Application November 3, 1939, Serial No. 302,750

8 Claims. (Cl. 170—177)

This invention relates to improvements in vibration suppressing devices and has particular reference to an improved vibration suppressing mechanism for an aeronautical propeller or engine-propeller combination.

An object of the invention resides in the provision of dynamic vibration suppressing devices for suppressing vibrations of an engine-propeller combination carried directly by an aeronautical propeller.

A further object resides in the provision of improved propeller carried means for directly suppressing torsional vibrations of the hub of an aeronautical propeller and simultaneously thereby suppressing the vibration of the propeller blades, such means being disposed on the propeller side of any flexible connection between the propeller and the propeller driving engine.

A somewhat more specific object resides in the provision of means for conveniently mounting dynamic vibration suppressing devices on an aeronautical propeller without unduly increasing the weight of the propeller.

Other objects and advantages will be more particularly pointed out hereinafter or will become apparent as the description proceeds.

In the accompanying drawing, in which like reference numerals are used to designate similar parts throughout, there is illustrated a suitable mechanical arrangement for the purpose of disclosing the invention. The drawing, however, is for the purpose of illustration only and is not to be taken as limiting the invention since it will be apparent to those skilled in the art that various changes in the illustrated construction may be resorted to without in any way exceeding the scope of the invention.

In the accompanying drawing, Fig. 1 is a front elevational view of the hub portion of an aeronautical propeller showing the application thereto of vibration suppressing devices constructed according to the invention.

Fig. 2 is an elevational view on an enlarged scale of one of the vibration suppressing devices shown in Fig. 1 and a portion of the propeller hub structure, and Fig. 3 is a sectional view on the line 3—3 of Fig. 2.

Referring to the drawing in detail, the numeral 10 generally indicates a propeller hub barrel formed in two separable portions and held together by suitable clamp bolts, as indicated at 12 and 14. A plurality of propeller blades 16 are secured at their base ends in the hub 10 and, in the case of a controllable-pitch propeller, are provided with anti-friction bearings so that the blades may rotate about their longitudinal axes relative to the hub. The hub may also carry a blade rotating motor covered by a suitable enclosure, such as the dome 18.

A plurality of vibration suppressing devices, such as is generally indicated at 20, are arranged about the propeller hub in such a manner as to mutually balance each other and thereby avoid disrupting the propeller balance. As shown, one such device may be disposed between each two adjacent propeller blades so that a three bladed propeller, as illustrated, would have three such devices disposed one hundred and twenty degrees apart. Each device may conveniently comprise an apertured cage member 22 provided with an integral, outwardly flared, preferably circular base portion 24, a movable cylindrical weight 26 in said cage member, and a pair of bracket members 28 and 30 for securing the cage member to the propeller barrel. The cage member 22 is provided with a circular aperture 24 and may be formed of hardened material, and the weight 26 may be retained in the cage by suitable means such as the annular flanges 34 and bars 36 extending at their ends through apertures provided in the cage and retained in place by suitable means such as the lock wires illustrated. The bracket members 28 and 30 are provided with portions which securely engage the flared base portion 24 of the cage 22 to secure the cage to the propeller hub in any desired position of angular adjustment with respect to the plane of rotation of the propeller so that the vibration dampers may be effective to suppress vibrations in the plane of rotation of the propeller or in planes including the axis of rotation or vibration resultants disposed at an angle to the plane of rotation and the axis, and with apertures through which the clamp bolts 14 extend to securely fasten the bracket members to the propeller barrel. If desired, additional bolts 38 may be provided to hold the base members in secure engagement with the base portion of the cage member. It will be noted that the clamp bolts 14 used to secure the bracket members to the propeller hub barrel are the intermediate bolts located between the blade receiving portions of the barrel, it is to be understood, however, that the vibration suppressing devices may be secured with equal facility to a unitary type propeller hub, in which the clamp bolts 12 and 14 are absent, by the provision of suitable securing means such, for example, as by providing apertured webs on the barrel member between the blade receiving portions thereof and inserting bolts through such apertures to secure the bracket members 28 and 30 to the propeller hub.

The general type of vibration suppressing device illustrated and hereinabove described is known to the prior art and operates by reason of the interchange of energy between the weight and the apertured weight carrying member. Thus if the immediate effect of a vibrational disturbance is to increase the speed of rotation the weight will be moved to one side of its position of rest in the weight carrying member and will absorb energy in being moved inwardly toward the axis of rotation against the effect of centrifugal force acting thereon. When the effect of the vibrational disturbance is to decrease the speed of rotation this energy will be restored to the weight carrying member and to the rotating piston to minimize the vibration induced variation in rotational speed. The mass of the weight, its diameter and the diameter of the weight receiving aperture may all be so dimensioned and proportioned as to tune the vibration suppressing device to a particular vibrational frequency, or range of vibration frequencies, so that particularly objectionable frequencies can be reduced in amplitude to a condition in which their effect becomes negligible.

While a particular construction has been hereinabove described and illustrated in the accompanying drawing for the purpose of disclosing the invention, it is to be understood that the invention is not limited to the particular construction so illustrated and described but that such changes in the size, shape and arrangements of the various parts may be resorted to as come within the scope of the subjoined claims.

Having now described the invention so that others skilled in the art may clearly understand the same, what it is desired to secure by Letters Patent is as follows:

1. In combination with a rotating body subject to torsional vibration, a plurality of dynamically acting vibration suppressing devices arranged about said body in a mutually counterbalancing relation and securely attached thereto, each vibration suppressing device comprising a cage having a cylindrical aperture positioned so that the longitudinal centerline of said aperture is substantially parallel to the axis of rotation of said rotating body, a cylindrical weight smaller than said aperture loosely held in said cage, and means comprising a pivotal joint having its axis radial to the axis of rotation of said propeller for attaching said cage to said rotating body for minor adjustments of the substantially parallel relationship between the centerline of said aperture and the axis of rotation of said rotating body.

2. In combination with an aeronautical propeller having a hub and a plurality of blades, a dynamically acting vibration suppressing device secured to each inter-blade portion of said hub and arranged in a mutually counterbalancing relation, each device comprising an apertured cage, a cylindrical weight in said cage, and means for attaching said cage to said hub.

3. In combination with an aeronautical propeller having a separable hub secured together by clamp bolts and a plurality of blades carried by said hub, a dynamically acting vibration suppressing device disposed between each two adjacent blades, each device comprising bracket members secured to said hub by said clamp bolts, an apertured cage member held by said bracket members, a cylindrical weight in the aperture of said cage member, and means for retaining said weight in said cage member.

4. In combination with an aeronautical propeller having a hub and a plurality of blades, a dynamically acting vibration suppressing device secured to each inter-blade portion of said hub and arranged in a mutually counterbalancing relation, each vibration suppressing device comprising a pair of bracket members secured to said hub, an apertured cage member having a recessed base portion engaged by said bracket members, means maintaining said bracket members in clamping relation about said base portion, a cylindrical weight in the aperture of said cage member, and means for retaining said weights in said cage member.

5. The arrangement as set forth in claim 2 in which said cages are disposed at an angle to the plane of rotation of said propeller.

6. In combination with an aeronautical propeller having a hub and a plurality of blades, a plurality of mutually counterbalancing dynamically-acting vibration suppressing devices secured to said hub, each said device comprising a movable cylindrical weight and an individual cylindrical track having a circumference greater than the circumference of said weight but less than the circumference of said hub for guiding the motions of said weight, and means comprising a pivotal connection having its axis perpendicular to the axis of rotation of said hub for attaching said track to said hub.

7. In combination with an aeronautical propeller having a hub and a plurality of blades, a plurality of mutually counterbalancing dynamically-acting vibration suppressing devices secured to said hub, each said device comprising a movable weight and a track for guiding the motions of said weight, means comprising a pivotal connection having an axis extending radially from the axis of rotation of said hub for adjustably attaching said track to said hub and holding means for holding said track in adjusted position.

8. In combination with an aeronautical propeller having a hub and a plurality of blades, a plurality of mutually counterbalancing dynamically-acting vibration suppressing devices secured to said hub, each said device comprising a movable weight and a respective annular track having its center spaced from the axis of rotation of said hub for guiding the motions of each weight, and means for attaching said tracks to said hub in a position such that movements of said weight relative to said track are at least partly in the direction of rotation of said hub.

ERLE MARTIN.
CHARLES M. KEARNS, Jr.